Figure 1:
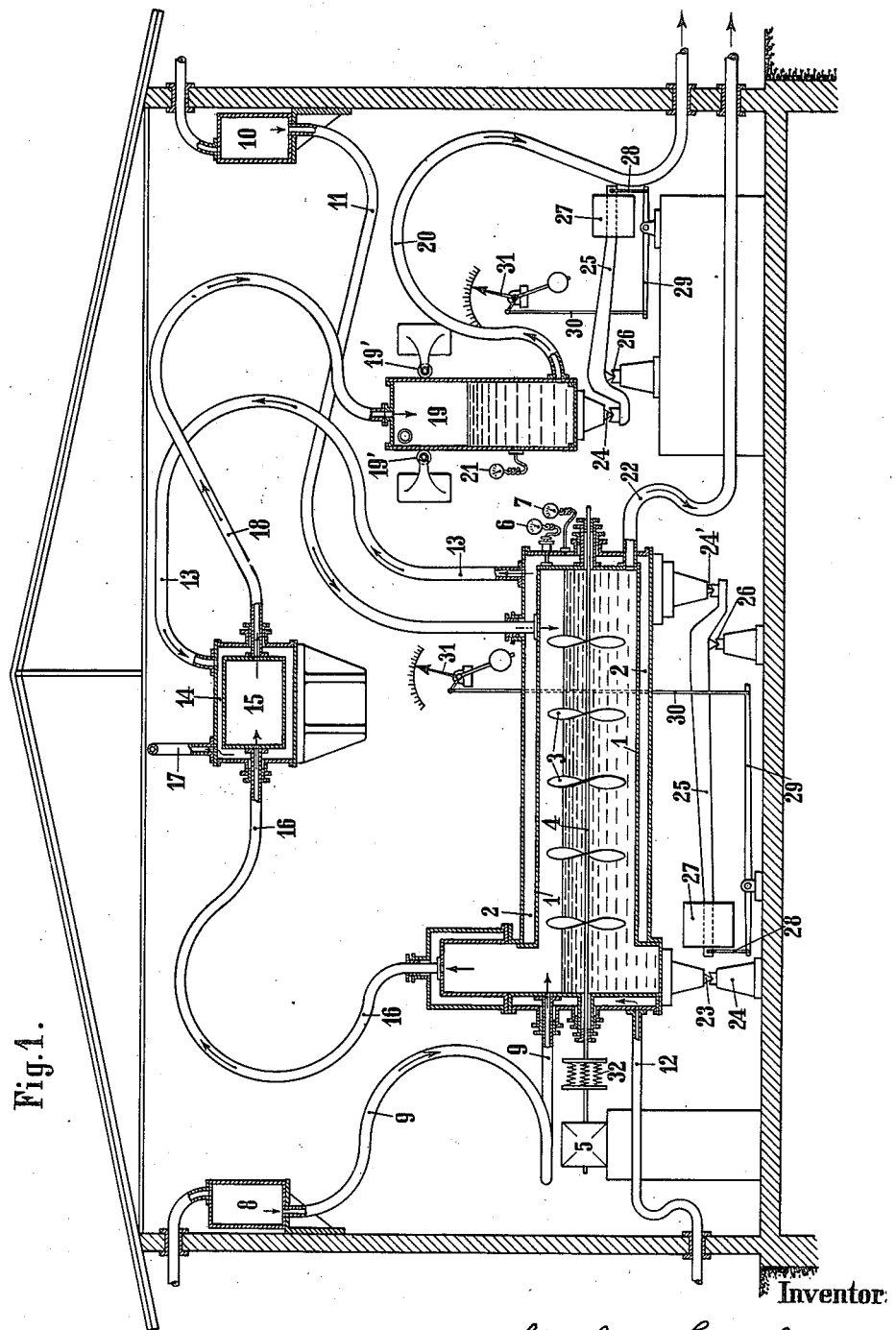

July 15, 1924.

S. LÖFFLER 1,501,124

DEVICE FOR INDICATING THE LEVEL OF LIQUID IN HIGH PRESSURE VESSELS

Filed April 2, 1923    2 Sheets-Sheet 1

Inventor:
Stephan Löffler,
by Byrne Townsend + Brickenstein,
Attys.

Inventor:
Stephan Löffler

Patented July 15, 1924.

1,501,124

UNITED STATES PATENT OFFICE.

STEPHAN LÖFFLER, OF CHARLOTTENBURG, NEAR BERLIN, GERMANY.

DEVICE FOR INDICATING THE LEVEL OF LIQUID IN HIGH-PRESSURE VESSELS.

Application filed April 2, 1923. Serial No. 629,523.

*To all whom it may concern:*

Be it known that I, STEPHAN LÖFFLER, a citizen of the German Republic, residing at Charlottenburg, near Berlin, Germany, have invented certain new and useful Improvements in a Device for Indicating the Level of Liquid in High-Pressure Vessels (for which I have filed patent application in Germany, July 18, 1921; Czechoslovakia, February 26, 1923; Belgium, March 2, 1923; France, March (ord.), 1923; Rumania, March (ord.), 1923; Great Britain, March (ord.), 1923), of which the following is a specification.

The invention relates to an apparatus for indicating the level or liquid in high pressure stills or other vessels during the working and is more particularly intended for high pressure vessels in which heavy hydrocarbons or coal are converted under high pressures and temperatures into light hydrocarbons, although it may also be used in connection with other high pressure vessels. To ensure the undisturbed reaction which takes place in such high pressure vessels, that is to say a continuous working, it is of the utmost importance that the operator should be able to ascertain at all times the contents of the high pressure vessel. If for instance the high pressure vessel does not contain sufficient reaction liquid, coking and separations are liable to take place.

The devices hitherto used for indicating the level of the liquid, such as for instance floats, are inadequate as they are too uncertain and too sensitive to comply with the requirements of high pressure working.

The object of the present invention is to provide a device which indicates the level of the liquid in the high pressure still or other vessel in a simple and reliable manner. The invention is based on determination of the liquid contents by weighing. The difficulty of determining the liquid level in high pressure vessels arises from the fact that the stills or other vessels are of extremely large capacity and weight, and there must be an indication at all times during working of the level of the liquid by weighing notwithstanding the pipe connections to the vessels. This problem is solved according to the invention by supporting the high pressure still with all its frequently numerous inlet and outlet pipes on a weighing apparatus, so that if it is assumed that the weighing apparatus has been removed, the high pressure still would be left freely suspended on its inlet and outlet pipes and would break away and drop down. The inlet and outlet pipes are mounted in such a yielding and elastic manner that they can follow the relatively small movements of the still during the weighing, without affecting the accuracy of measurement of the liquid level.

The weighing machine may be of any desired kind, such as a pendulum weighing machine, a hydraulic measuring box or the like. The weight may be indicated in various ways, by transmission to an index, by a running or sliding weight, hydraulically, electrically, etc.

The high pressure stills or other vessels such as those used for the above mentioned example of the manufacture of light hydrocarbons, being heated from the outside by means of a jacket or casing, it is also necessary that the inlet and outlet pipes of the jacket should be able to follow the movements of the high pressure still during the weighing.

It has recently been found preferable to carry out the conversion of hydrocarbons in two or more high pressure stages in connected stills. The manner in which this is carried out forms no part of the present invention. The invention is merely intended to obtain indications of the liquid level in the stills or vessels singly or the combined weight or average liquid level in the several stills. This problem is solved, in the case in which several connected stills are used for the so-called stage working, by supporting each high pressure still on a weighing machine, in the same manner as in the case of a single still, but at the same time by providing an indicator device which indicates the liquid level in each still or other vessel singly, and also the average level in both stills.

The invention will be more fully explained with reference to the accompanying drawings, in which—

Figure 1 shows the arrangement for a single still heated by a jacket, and

Figure 2:
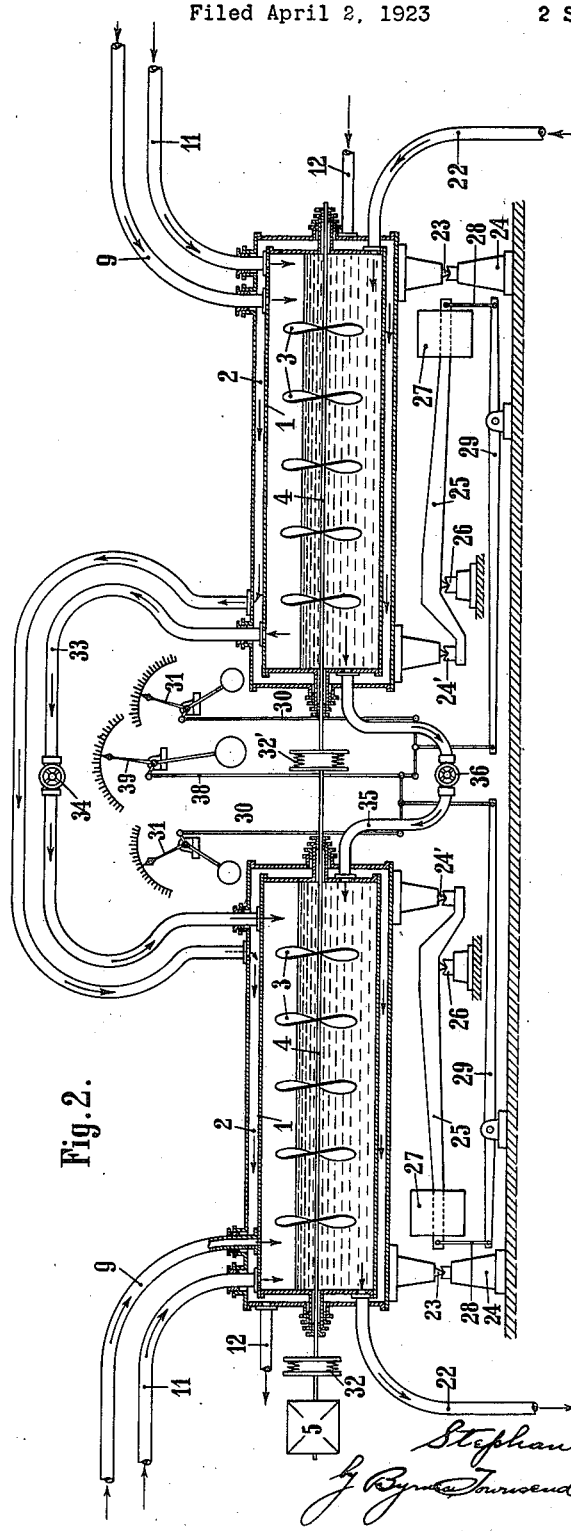

Figure 2 the arrangement for two connected stills for carrying out the conversion of hydrocarbons in stages.

Figure 1 shows the installation in which a high pressure still for treating hydrocarbons is connected to various tanks, for the raw material supply (hydrocarbons and hydrogen) and for purifying and condensing the distillates.

1 is the high pressure still which is heated by a jacket 2, 3 is the stirring device on the shaft 4 which is driven by a motor 5, 6 and 7 are pressure gauges for the still 1 and the jacket 2.

The hydrocarbons to be treated are admitted into the still 1 from the tank 8 through a supply pipe 9; hydrogen is admitted from the tank 10 through a pipe 11 into the high pressure still 1. The jacket space 2 receives the heating medium (neutral hot gases under pressure) through a pipe 12, the said medium being discharged through 13. The discharge or outlet pipe 13 is connected at the other end to the jacket 14 of the purifying tank 15 into which the distillates pass from the high pressure still 1 through a pipe 16. The heating medium escapes from the jacket 14 through a pipe 17, whilst the distillates are conveyed through a pipe 18 into a condenser 19. The condensed end-products escape from the condenser 19 through a pipe 20. The condenser 19 is provided with a pressure gauge 21. The residue from the high pressure still 1 is discharged through a pipe 22. In the construction illustrated, the level of liquid in the high pressure still 1 and in the condenser 19 is determined in the following manner:

The still 1 rests by means of a knife edge 23 on a support 24 so that it can turn about the said knife edge. This turning movement is transmitted by the knife edge 24' secured to the other end, which rests on one end of the balance beam 25. The beam 25 is pivoted about a knife edge 26 and carries a weight 27 for balancing the empty vessel. This end of the balance beam is connected by rods 28, 29, 30 to an indicator device 31 which, when suitably gauged, allows the liquid level to be read direct.

All the supply and discharge pipes are so arranged that they can follow the movement of the still 1. The same applies to the coupling of the stirring device shaft 4 to the motor 5, for which purpose is inserted a yielding or spring coupling 32.

The condenser 19 is mounted, in the same manner as the still 1, on the beam of a weighing machine, for which the same reference numerals are used. As the movements of the condenser during the weighing are rectilinear, it is guided between rollers 19', 19'.

Figure 2 shows the invention applied to a pair of connected stills, in which the work is carried out in stages. The stills are connected together in the following manner: by the stirring device shaft which is carried right through, for which purpose a second elastic or spring coupling 32' is inserted, by the connecting pipe 33 for the gas chambers, which is provided with a valve 34; by the connecting pipe 35 for the liquid chambers, which is provided with a valve 36, and finally by the connecting pipe 37 for the jackets. The object of the valves 34 and 36 is to enable the distillation to be carried on in either still independently of the other.

Each still rests independently on a weighing machine and has its own indicator 28—31, so that the level of the liquid in each still is separately indicated. In addition, however, the rods of the single indicators are connected to another rod 38 which leads to a joint indicator 39 which gives the total weight of the contents of the two stills and therefore the average liquid levels.

If it is desired to read the liquid level in the separate stills the rod 38 for determining the total weight must be locked; if on the contrary it is desired to read the total weight on the indicator 39, the rods for the single indicators must be locked.

Having now particularly described and ascertained the nature of my said invention and in what manner the same is to be performed, I declare that what I claim is:—

1. The combination with a vessel adapted to resist high pressure, means for introducing material into said vessel, means for supplying energy to said vessel to promote a change in the material contained therein, of a balance system supporting said vessel, said balance system constructed and arranged to be in equilibrium with the weight of the vessel and a definite amount of material therein, and means for translating the relative movement of the vessel and the balance due to variation in the amount of material in the vessel to indicate the quantity of material therein.

2. The invention as claimed in claim 1, wherein said means for supplying material and energy to said vessel comprise fluid conduits adapted to take part in the movement of the vessel without materially affecting the action of the vessel upon the balance.

3. The invention as claimed in claim 1, wherein said means for supplying material and energy to said vessel comprise fluid conduits having loops disposed in substantially vertical planes, whereby said conduits are free to follow the movement of the vessel without materially affecting the action of the vessel upon the balance.

4. The combination of a plurality of vessels, a balance system including a plurality of weighing arms for separately supporting the vessels, means for separately indicating the action of each vessel upon its weighing arm, and means for indicating the integrated weighing action of all vessels upon the balance system.

5. The combination of a vessel, means in the vessel for agitating the contents thereof, motor means, transmission mechanism extending into the vessel for actuating the agitating means, the transmission mechanism including a coupling permitting relative angular movement, a balance system supporting the vessel, constructed and arranged to be in equilibrium with the weight of the vessel and a definite amount of material therein and means for translating the relative movement of the vessel and the balance due to variations in the amount of material in the vessel to indicate the level of the material.

6. The combination with a vessel of the type described, of means including a pivotal bearing for supporting one end of the vessel, a balance, the weighing arm of which supports the other end of the vessel, means acting on the weighing arm to counter-balance the weight of the vessel and a definite amount of material therein, and means for translating the movement of the weighing arm due to variations in the amount of the material in the vessel to indicate the level thereof.

In testimony whereof, I affix my signature.

Professor Dr. STEPHAN LÖFFLER.